United States Patent

Van Essen et al.

[15] 3,688,128

[45] Aug. 29, 1972

[54] ARRANGEMENT FOR DECODING A FOUR-LEVEL SIGNAL

[72] Inventors: Hendrik Arie Van Essen; Arie Slob, both of Emmasingel, Eindhoven, Netherlands

[73] Assignee: U.S. Philips Corporation, New York, N.Y.

[22] Filed: March 25, 1971

[21] Appl. No.: 128,341

[30] Foreign Application Priority Data

April 18, 1970 Netherlands..............7005644

[52] U.S. Cl....................307/235, 328/147, 330/30 D

[51] Int. Cl...............................................H03k 5/20

[58] Field of Search......328/147; 330/30 D; 307/235

[56] References Cited

UNITED STATES PATENTS 3,585,507 6/1971 Bickel....................328/147 X 3,597,626 8/1971 Heightley...............307/230 X 3,599,096 8/1971 Stemples et al.........328/147 X 3,600,607 8/1971 Vatin.........................307/235

*Primary Examiner*—John S. Heyman

*Attorney*—Frank R. Trifari

[57] ABSTRACT

A device for decoding a four-level signal comprising two mutually connected digital circuits which are each provided with a current source and an associated switching member so as to connect the current source to an output impedance associated with the relevant digital circuit, the switching member associated with one digital circuit responding to a previously determined amplitude value of the input signal applied to the two digital circuits, and the switching member associated with the other digital circuit responding to a certain first or second amplitude value of the input signal dependent on the position of the switching member of the first digital circuit.

5 Claims, 3 Drawing Figures

*INVENTORS*
HENDRIK A. VAN ESSEN
ARIE SLOB
*BY*
[signature]
AGENT

INVENTORS
HENDRIK A. VAN ESSEN
ARIE SLOB
BY

ARRANGEMENT FOR DECODING A FOUR-LEVEL SIGNAL

The invention relates to an arrangement for decoding a four-level signal and may be used in receivers used in transmission systems in which, for the purpose of increasing the information speed in the prescribed frequency band by a factor of 2 or 3, the transmitter is arranged for the transmission of multilevel pulse series obtained by conversion of binary pulse series and having, for example, 4 or 8 amplitude levels.

Since the pulse resolution is decreased due to the conversion into multilevel pulse series and the sensitivity to interference is increased, special attention must be paid to the decoder used in the receiver. The decoder should be able to carefully distinguish the different amplitude levels so as to recover the original binary pulse series.

An object of the present invention is to provide a decoder of the kind described in the preamble which is very accurate and whose structure is also simple so that integration in a semiconductor body becomes possible.

According to the invention such an arrangement for decoding a four-level signal to this end comprises first and second digital circuits each one including a current source, an output impedance and associated switching means, a common input circuit through which the four-level input signal is applied to both said digital circuits and means interconnecting said digital circuits, so that the switching means of said first digital circuit is operated to connect the current source of said first digital circuit to its associated output impedance in response to the applied input signal being of a predetermined first amplitude level and the switching means of said second digital circuit is operated to connect the current source of said second digital circuit to its associated second or third amplitude level of the applied input signal depending upon the position of the switching means of said first digital circuit.

Figure 1:
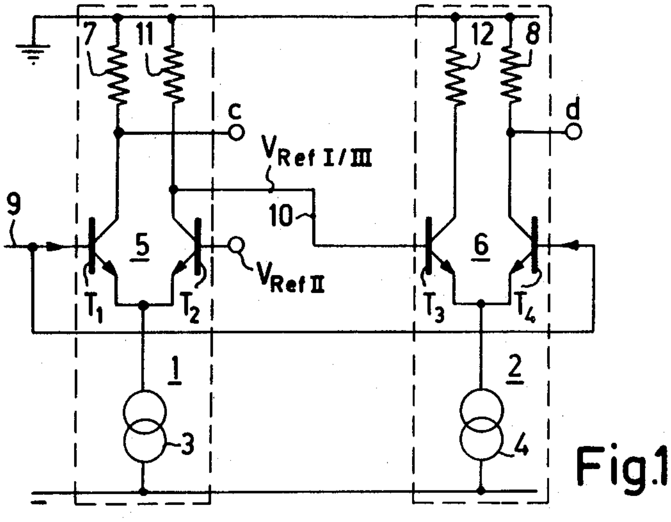
Figure 3:
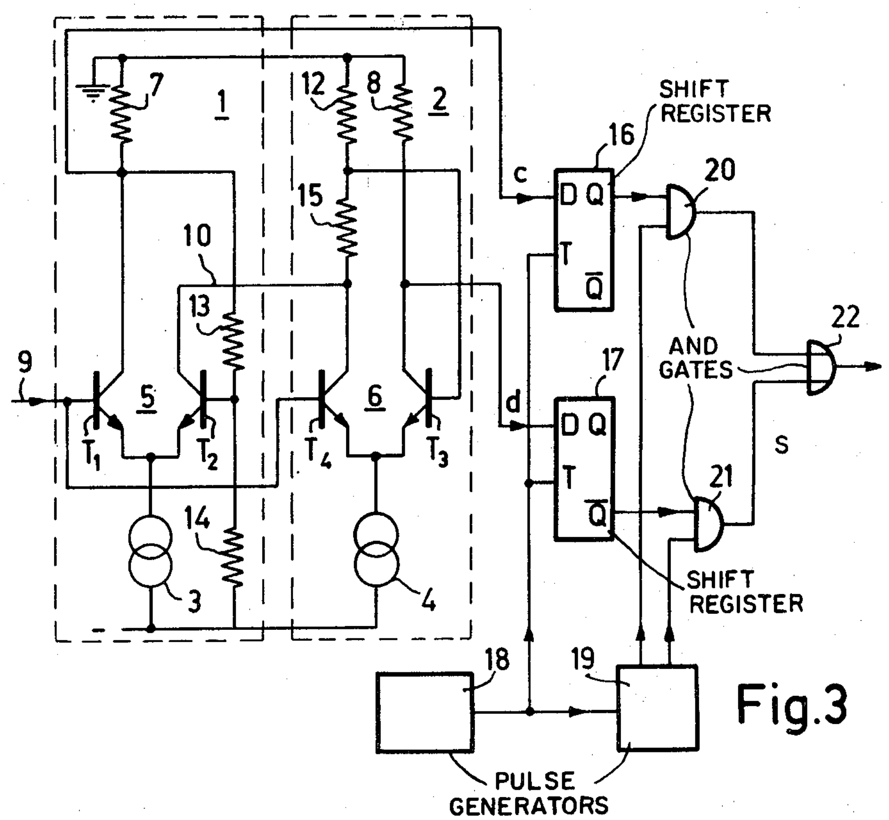
Figure 2:
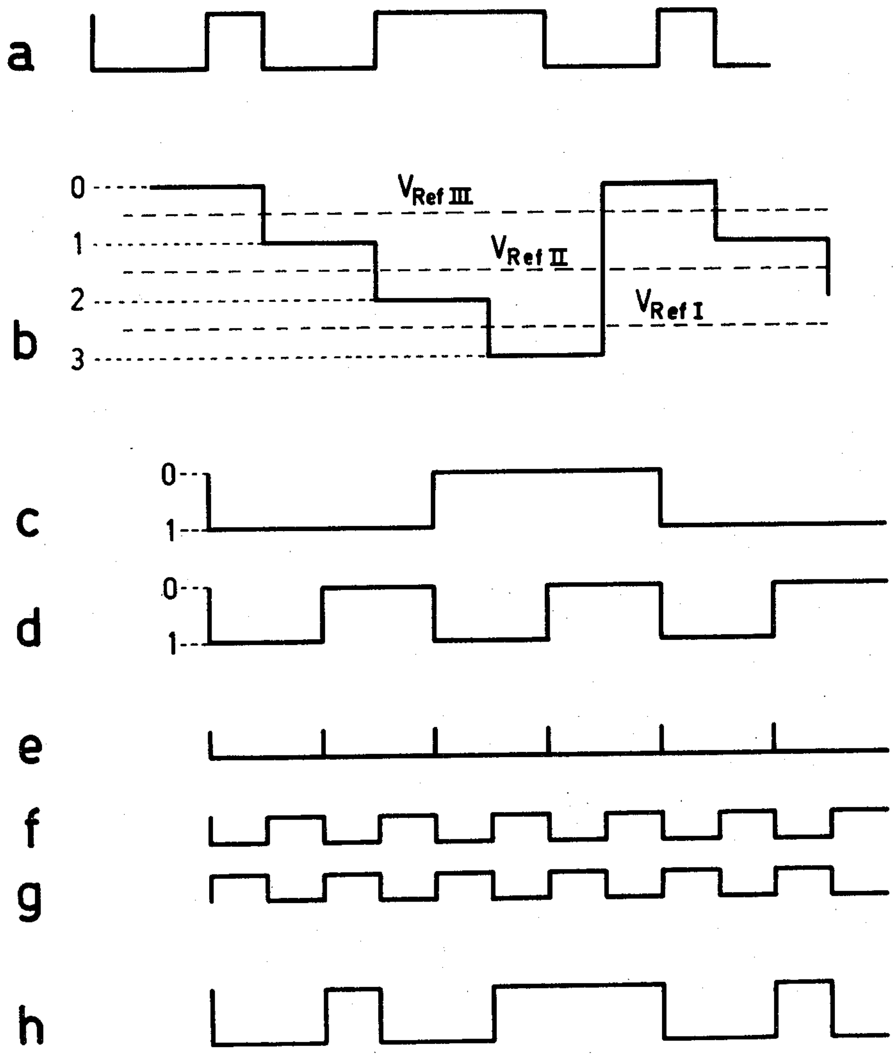

In order that the invention may be readily carried into effect, some embodiments thereof will now be described in detail by way of example, with reference to the accompanying diagrammatic drawings in which:

FIG. 1 shows the principle circuit diagram of a decoder according to the invention, FIG. 2 shows some diagrams to explain the operation of the decoder according to the invention, and FIG. 3 shows a practical embodiment of such a decoder.

A binary data signal consists of successive bit periods within which the signal may represent the value "1" or "0" dependent on the level. If successive groups of two bit periods are considered, the following combinations are possible: 0,0; 0,1; 1,0; and 1,1. When a binary data signal is transmitted as a quaternary signal this means that each of the four levels of the quaternary signal characterizes one of the above-mentioned four possible combinations. For the purpose of explanation FIG. 2*b* shows a quaternary signal in n idealized form. This quaternary signal is representative of the original binary data signal of FIG. 2*a* to be recovered at the receiver end with the aid of a decoder.

According to the invention a decoder which, as shown in FIG. 1, is favorable and advantageous for this purpose, comprises two digital circuits 1,2 which are each provided with current sources 3, 4 and associated switching members 5, 6 in order to connect the current source to output impedances 7 and 8, respectively, associated with the relevant digital circuit, a common input circuit 9 through which the four-level signal to be decoded is applied to the two digital circuits 1, 2 and a connection circuit 10 which mutually connects the two digital circuits, the switching member 5 associated with one digital circuit 1 responding to a predetermined first amplitude value of the input signal and the switching member 6 associated with the other digital circuit 2 responding to a certain second or third amplitude value of the input signal dependent on the position of the switching member 5 of the first digital circuit 1. As is shown in the FIG. 1, the switching members 5 and 6 are each formed by transistor pairs $T_1$, $T_2$ and $T_3$, $T_4$, respectively.

The transistors $T_1$ and $T_4$ are connected to ground through the output impedances 7 and 8, respectively, functioning as collector resistors, while the transistors $T_2$ and $T_3$ are likewise connected to ground through the collector resistors 11 and 12, respectively. The current sources 3, 4 are incorporated in the common emitter circuit of the transistor pairs $T_1$, $T_2$ and $T_3$, $T_4$, respectively.

The base of transistor $T_2$ is connected to a fixed reference level which is denoted by $V_{Ref.II}$ in FIG. 1 and FIG. 2*b*. The base of transistor $T_3$ is connected through the connection circuit 10 to the collector of transistor $T_2$, the voltage across collector resistor 11 occurring as a reference level at the base of transistor $T_3$. The last-mentioned reference level then assumes one of the two possible values denoted by the references $V_{Ref.I}$ or $V_{Ref.III}$ shown in FIG. 1 and FIG. 2*b* dependent on whether transistor $T_2$ is in its conducting state or not. The quaternary input signal (FIG. 2*b*) is applied through the common input circuit 9 to the base of transistor $T_1$ and $T_4$. The operation of the decoder is then as follows:

When the level of the input signal has the instantaneous negative value denoted by the reference numeral 3 in FIG. 2*b*, the transistors $T_1$ and $T_4$ are cut off and a current exclusively flows through the transistors $T_2$ and $T_3$ because on the one hand the level t the base of $T_1$ is more negative than the reference level $V_{REF.II}$ applied to the base of $T_2$ and on the other hand the level at the base of $T_4$ is more negative than the reference level $V_{Ref.I}$ applied to the base of $T_3$ as determined by the negative voltage which occurs across collector resistor 11 when $T_2$ is conducting.

The voltages occurring at the outputs *c* and *d* are in this case substantially equal to zero.

When the level of the input signal has the instantaneous negative value denoted by the reference numeral 2 in FIG. 2*b*, that is to say, when the level of the input signal lies between the reference levels $V_{REF.I}$ and $V_{Ref.II}$ the transistors $T_1$ and $T_3$ are cut off and a current exclusively flows through the transistors $T_2$ and $T_4$, because on the one hand the level at the base of $T_1$ is more negative than the reference level $V_{Ref.II}$ applied to the base of $T_2$ and on the other hand the level at the base of $T_4$ is less negative than the reference level $V_{Ref.I}$ occurring at the base of $T_3$ and corresponding to the negative voltage occuring across collector resistor 11 when $T_2$ is conducting. The voltage at the output *c* remains equal to zero in this case, while the voltage at the output *d* assumes a negative value.

If the level of the input signal assumes the instantaneous value denoted by 1 in FIG. 2*b*, this means that the level of the input signal is less negative than the reference level $V_{Ref.II}$ and $T_1$ becomes conducting while $T_2$ is cut off. The result of $T_2$ being cut off is that the reference level applied to the base of $T_3$ changes from $V_{Ref.I}$ to $V_{Ref.III}$ because the voltage across the collector resistor 11 becomes considerably less negative. Since the input signal applied to the base of $T_4$ is more negative than the reference level $V_{Ref.III}$ occurring at the base of $T_3$, $T_3$ becomes conducting and $T_4$ is cut off.

The voltage at the output *c* is negative in that case, while the voltage at the output *d* is equal to zero.

If the level of the input signal assumes the value denoted by 0 in FIG. 2*b*, this means that the level of the input signal is less negative than the two reference levels $V_{Ref.II}$ and $V_{Ref.III}$ and the situation occurs where $T_1$ and $T_4$ are conducting, and $T_2$ and $T_3$ are cut off. The voltages at the outputs *c* and *d* are negative in this case.

If a "0" is written for a negative output voltage and a "1" is written for an output voltage of the value zero, the voltages occurring at the outputs *c* and *d* for the respective levels for the input signals may be summarized in the following Table.

| level | c | d |
|---|---|---|
| 0 | 0 | 0 |
| 1 | 0 | 1 |
| 2 | 1 | 0 |
| 3 | 1 | 1 |

This Table clearly illustrates that the output voltages *c* and *d* are representative of the four possible combinations such as may occur during every two bit periods of the original binary signal.

Since one of the digital circuits in the device described above operates with two different reference levels, two instead of three digital circuits may suffice which is a considerable advantage particularly when the device is integrated in a semiconductor body.

In the practical embodiment as shown in FIG. 3, the parts corresponding to those in FIG. 1 are denoted by the same reference numerals. This embodiment is only different from the principle circuit diagram shown in FIG. 1 in that the output impedance 7 forms part of a voltage divider circuit located between the supply terminals and including resistors 13 and 14 whose mutual junction is connected to the base $T_2$ while furthermore the connection circuit 10, which connects the collector of $T_2$ to the base of $T_3$, incorporates a resistor 15 which also forms part of the common collector circuit of $T_4$ and $T_2$.

Consequently, since the collector of $T_1$ is connected through the said resistor 13 to the base of $T_2$ and since the collector of $T_4$ is connected through the said resistor 15 to the base of $T_3$, the switching members 5 and 6 have the property of a "Schmitt trigger" (relaxation circuit) and the sensitivity and the accurate operation is ensured because switching over is thus effected very rapidly and the correct reference level is substantially immediately available for the digital circuit 2.

Furthermore, it may be noted with reference to FIG. 3 that the output impedance 8 is incorporated in the collector circuit of $T_3$ instead of in the collector circuit of $T_4$. This, however, is no essential difference, because this only means that the signal occurring at the output *d* is inverted.

To further illustrate the advantageous properties of the decoder according to the invention, FIG. 3 also shows the means which are necessary to regenerate the original binary data signal while starting from the signals occurring at the outputs *c* and *d*.

To this end, the signals occurring at the outputs *c* and *d* are applied to the input D of first and second shift register elements 16, 17, respectively, having inputs D and T and outputs Q and $\overline{Q}$, respectively. These shift register elements are controlled by the clock pulses shown in FIG. 2, which pulses are generated with the aid of a clock pulse generator 18 synchronized in the conventional manner. These clock pulses are applied as writing pulses 16, 17 on the one hand and are applied to a gating pulse generator 19 on the other hand, which generator provides the gating pulse series shown in the FIGS. 2*f* and *g*.

Each shift register element then registers every time a "1" or a "0" at the writing instants dependent on whether the signal applied to the input D is zero or is negative. For the purpose of illustration, the signals occurring at the output Q of shift register element 16 and at the output $\overline{Q}$ of shift register element 17 are shown in FIGS. 2*c* and *d*. These signals are subsequently applied to two "AND" gates 20, 21 which are alternately opened by the gating pulses shown in FIGS. 2*f* and *g*, while the signal shown in FIG. 2*h* occurs at the output of the "OR" gate 22 connected to the two gates 20 and 21, which signal is identical to the original binary signal of FIG. 2*a*.

Since there generally applies that the number of shift register elements and gates required for regeneration directly relates to the number of output signals provided by the decoder, the decoder according to the invention, together with the mentioned great structural simplicity and great accuracy, has the additional advantage that the means required for regenerating the original signal may be very simple, for, as shown, this decoder, in contrast with the known type of decoders, only provides two output signals.

What is claimed is:

1. A decoder for a four-level signal, comprising first and second digital circuits, each of said first and said second digital circuits comprising a current source, a switching means, and an output load impedance, a common input circuit for applying the four-level signal to the input means of the first and the second digital circuits, first reference voltage level means coupled to the first digital circuit, and means interconnecting the first and the second digital circuits, said switching means of said first digital circuit connecting said current source of said first digital circuit to said output load impedance of said first digital circuit for a four-level input signal of a predetermined first amplitude level with respect to said first reference voltage level, said first digital circuit generating second and third reference voltage levels in correspondence to the amplitude of the four-level input signal, said second and said third reference voltage level means being coupled to said second digital circuit by said interconnecting means, said switching means of said second digital circuit connecting said current source of said second digital circuit to said output load impedance of said second digital circuit for a four-level input signal of a predetermined second or third amplitude level with respect to said second or said third reference voltage levels respectively.

2. A decoder as claimed in claim 1, wherein each of said switching means comprises a pair of transistors in a common emitter configuration, each of said output load impedance being in series with the collector of one of said transistors in each of said respective transistor pairs.

3. A decoder as claimed in claim 2, wherein said common input circuit is connected to the base of a transistor in one transistor pair and to the base of a transistor in the other transistor pair, said first reference voltage level being coupled to the base of the other transistor in said one transistor pair, said second and said third reference voltage levels being coupled to the base of the other transistor of said other transistor pair, said second and third voltage levels being generated in correspondence to conducting and non-conducting of one of the transistors in said one transistor pair.

4. A decoder as claimed in claim 3, wherein said interconnecting means connects the collector of said other transistor in said one transistor pair to the base of said other transistor of said other transistor pair.

5. A decoder as claimed in claim 2, wherein each of said transistor pairs comprises a circuit for connecting the collector of one transistor to the base of the other transistor.

* * * * *